US012209442B2

(12) United States Patent
Tokudome et al.

(10) Patent No.: US 12,209,442 B2
(45) Date of Patent: Jan. 28, 2025

(54) VEHICLE DOOR HANDLE DEVICE

(71) Applicant: TOYODA GOSEI CO., LTD., Kiyosu (JP)

(72) Inventors: Naoki Tokudome, Kiyosu (JP); Kenichiro Kaneko, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 168 days.

(21) Appl. No.: 17/886,591

(22) Filed: Aug. 12, 2022

(65) Prior Publication Data

US 2023/0068522 A1 Mar. 2, 2023

(30) Foreign Application Priority Data

Aug. 30, 2021 (JP) ................................ 2021-140540

(51) Int. Cl.

*E05B 81/06* (2014.01)
*E05B 81/76* (2014.01)
*E05B 85/10* (2014.01)

(52) U.S. Cl.

CPC ............ *E05B 85/107* (2013.01); *E05B 81/06* (2013.01); *E05B 81/76* (2013.01)

(58) Field of Classification Search

CPC ........ E05B 85/107; E05B 81/06; E05B 81/76; E05B 77/54; E05B 81/82; E05B 77/12; E05B 85/103

See application file for complete search history.

(56) References Cited

U.S. PATENT DOCUMENTS

| | | | | |
|---|---|---|---|---|
| 8,267,464 | B2 * | 9/2012 | Konchan ................ | E05B 77/12 292/DIG. 21 |
| 10,815,702 | B2 | 10/2020 | Yoshino | |
| 11,795,739 | B2 | 10/2023 | Heyduck et al. | |
| 11,933,085 | B2 | 3/2024 | Jeong | |

(Continued)

FOREIGN PATENT DOCUMENTS

| | | |
|---|---|---|
| DE | 102018010031 A1 | 6/2020 |
| JP | H05-059855 A | 3/1993 |

(Continued)

OTHER PUBLICATIONS

Office Action dated Sep. 3, 2024 issued in corresponding Japanese Patent Application No. 2021-140540 (and English translation).

(Continued)

*Primary Examiner* — Michael P Ferguson
*Assistant Examiner* — Thomas L Neubauer
(74) *Attorney, Agent, or Firm* — Posz Law Group, PLC

(57) ABSTRACT

This vehicle door handle device includes: a door handle provided to a vehicle door and shiftable between a stored state of being stored in the vehicle door and an exposed state of being exposed from a surface opening of the vehicle door, the door handle being configured to allow an opening operation of releasing a latch of the vehicle door in the exposed state; a door handle actuator configured to shift the door handle between the stored state and the exposed state; an abnormality detection unit configured to detect abnormality of a vehicle; and a control unit configured to control the door handle actuator so that the door handle shifts from the stored state to the exposed state when the abnormality is detected.

8 Claims, 3 Drawing Sheets

(56) References Cited

U.S. PATENT DOCUMENTS

| | | | | |
|---|---|---|---|---|
| 2010/0007463 | A1* | 1/2010 | Dingman ................ | E05B 81/78<br>340/425.5 |
| 2014/0327252 | A1* | 11/2014 | Sobecki .................. | E05B 5/006<br>292/336.3 |
| 2017/0089102 | A1 | 3/2017 | Yoshino | |
| 2021/0324664 | A1 | 10/2021 | Jeong | |
| 2021/0381287 | A1* | 12/2021 | Guerin .................... | E05B 85/16 |
| 2022/0042355 | A1 | 2/2022 | Heyduck et al. | |
| 2023/0227125 | A1* | 7/2023 | Ji ............................ | F24S 25/16<br>114/266 |
| 2023/0258030 | A1* | 8/2023 | Herman .................. | B60R 25/23<br>292/336.3 |

FOREIGN PATENT DOCUMENTS

| | | | |
|---|---|---|---|
| JP | 2017-66605 | A | 4/2017 |
| KR | 102122714 | B1 | 6/2020 |

OTHER PUBLICATIONS

Office Action mailed May 28, 2024 in corresponding Japanese Patent application No. 2021-140540 (and English machine translation).

* cited by examiner

VEHICLE DOOR HANDLE DEVICE

TECHNICAL FIELD

The present invention relates to a vehicle door handle device mounted to a vehicle.

BACKGROUND ART

In recent years, a vehicle door handle of a so-called pop-up type has been increasingly used for improving the design and aerodynamic performance a vehicle. This door handle is shiftable between a stored state of being stored in a vehicle door and an exposed state of being exposed from a surface opening of the vehicle door so as to pop up toward outside of the vehicle. The door handle allows a latch of the vehicle door to be released through an opening operation by an operator in the exposed state.

For example, in a vehicle door handle device described in Japanese Laid-Open Patent Publication No. 2017-66605, when a door handle in the stored state is pressed toward inside of a vehicle, the door handle pops up toward outside of the vehicle so as to move into an exposed state. In this exposed state, for example, if the door handle is pulled toward outside of the vehicle, a latch of the vehicle door is released, so that the vehicle door is opened.

SUMMARY OF INVENTION

Technical Problem

However, in the stored state of the door handle, the door handle remains stored in the vehicle door and does not pop up toward outside of the vehicle. Therefore, a person who does not know the structure of the vehicle may be unable to find the door handle immediately or to recognize how to enable the door handle to be operated, i.e., enable the vehicle door to be opened. Thus, for example, in a case where a vehicle accident has occurred, a rescuer has trouble in opening the vehicle door and is likely to be late in rescuing an occupant in the vehicle.

The present invention has been made in view of the above circumstances, and an object of the present invention is to provide a vehicle door handle device configured such that, when abnormality of a vehicle has occurred, a door handle stored in a vehicle door is exposed to outside of the vehicle so as to allow an opening operation, so that, when abnormality of the vehicle has occurred, the door handle readily found and the vehicle door is readily opened.

Solution to Problem

An aspect of the present invention is directed to a vehicle door handle device including: a door handle provided to a vehicle door and shiftable between a stored state of being stored in the vehicle door and an exposed state of being exposed from a surface opening of the vehicle door, the door handle being configured to allow an opening operation of releasing a latch of the vehicle door in the exposed state; a door handle actuator configured to shift the door handle between the stored state and the exposed state; an abnormality detection unit configured to detect abnormality of a vehicle; and a control unit configured to control the door handle actuator so that the door handle shifts from the stored state to the exposed state when the abnormality is detected.

In this configuration, when abnormality of the vehicle is detected, the door handle shifts from the stored state to the exposed state. Thus, when abnormality of the vehicle has occurred, the door handle stored in the vehicle door is exposed to outside of the vehicle so as to allow an opening operation, so that, when abnormality of the vehicle has occurred, the door handle is readily found and the vehicle door is readily opened.

DESCRIPTION OF EMBODIMENTS

Hereinafter, a specific embodiment of a vehicle door handle device according to the present invention will be described.

A vehicle door handle device 1 of the present embodiment is mounted to a vehicle and is a device for actuating a door handle Provided to a vehicle door 2.

The vehicle door 2 is a riding door through which a vehicle occupant gets in/off, and is openable/closable with respect to uhe vehicle body. The vehicle door 2 is allowed to be locked by a lock devce 3, in a state of being closed with respect to uhe vehicle body. In addition, the vehicle door 2 is allowed to be opened with respect to the vehicle body, in a state of being unlocked by the lock device 3.

The lock device 3 switches the vehicle door 2 from a locked state to an unlocked state, for example, in a case where, outside the vehicle, radio communication with a portable key carried by a proper vehicle user is established and a predetermined unlock operation is performed, a case where the proper vehicle user performs an unlock operation via wireless communication outside the vehicle, a case where an opening operation is performed on a door knob inside the vehicle, or a case where a predetermined period (e.g., several tens of seconds or several minutes) has elapsed since occurrence of abnormality such as a vehicle accident described later. In addition, the lock device 3 switches the vehicle door 2 from the unlocked state to the locked state, for example, in a case where a lock operation is performed on a lock knob inside the vehicle, a case where the vehicle starts to travel and reaches a predetermined speed (e.g., 20 km/h), a case where, outside the vehicle, radic communication with the portable key carried by the proper vehicle user is established and a predetermined lock operation is performed, a case where a lock operation is performed via wireless communication outside the vehicle, or a case where abnormality of the vehicle described later has occurred.

The vehicle door 2 to which the door handle is provided may be a rear door, a hood, a door lid for closing a fuel port or a charge port, or the like, instead of the above riding door.

Figure 1:
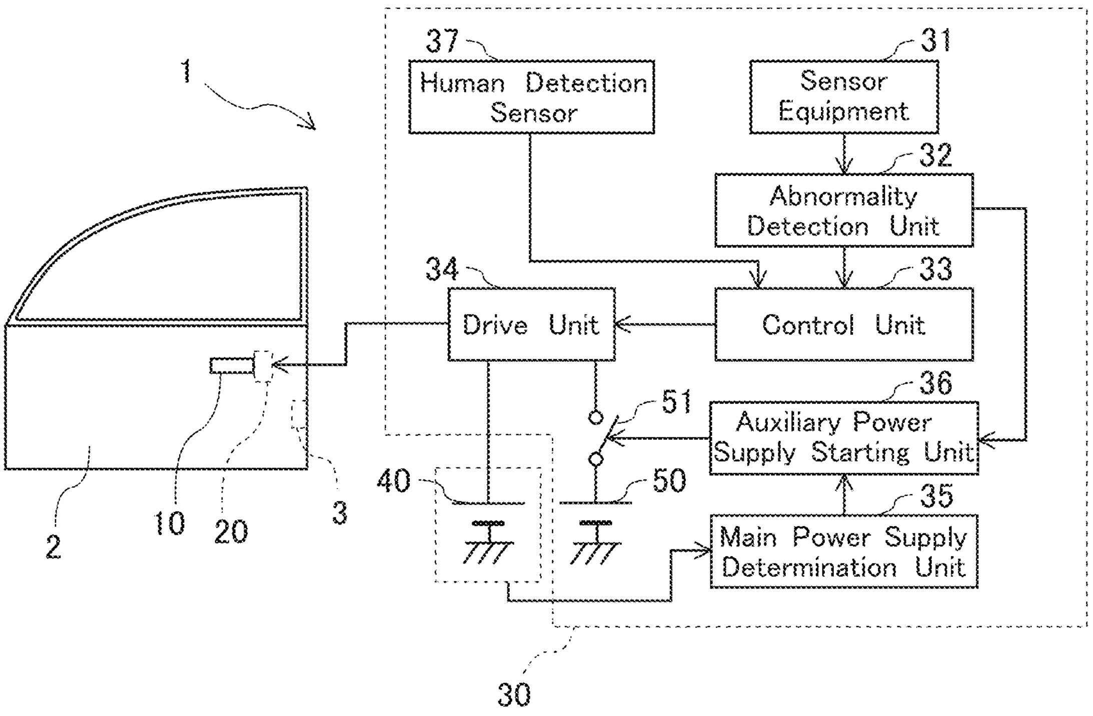
FIG. 1 is a block configuration diagram of a vehicle door handle device according to an embodiment of the present invention.

As shown in FIG. 1, the vehicle door handle device 1 includes a door handle 10, a door handle actuator 20, a control device 30, a main power supply 40, and an auxiliary power supply 50.

Figure 2:
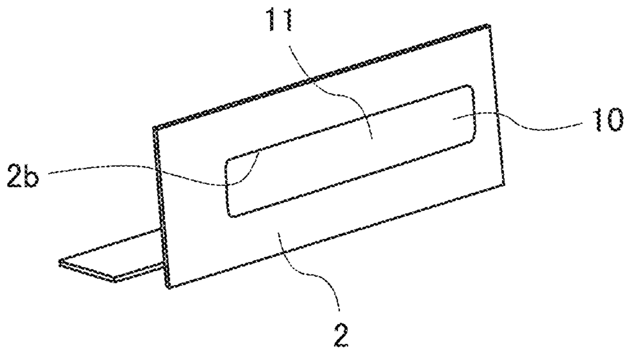
FIG. 2 is a perspective view in a stored state of a door handle provided to the vehicle door handle device of the embodiment.
Figure 3:
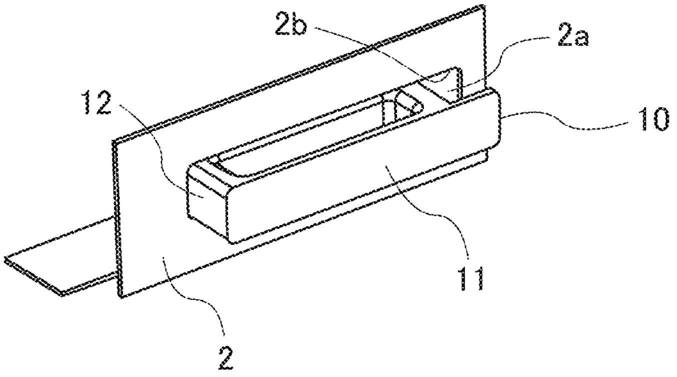
FIG. 3 is a perspective view in an exposed state of the door handle provided to the vehicle door handle device of the embodiment.

The door handle 10 is an operation portion for performing an opening operation when a person opens the vehicle door 2. When an opening operation is performed on the door handle 10, the latch state of the vehicle door 2 with respect to the vehicle body is released so that the vehicle door 2 is opened. As shown in FIG. 2 and FIG. 3, the door handle 10 is formed in a handle shape extending in the horizontal direction. The opening operation performed on the door handle 10 by the person may be, for example, an operation of pulling a later-described lid portion 11 of the door handle 10 toward outside of the vehicle with respect to a support portion 12 by a predetermined force or greater, or a contact operation or a noncontact operation detectable by a touch sensor or the like provided on the back side of the lid portion 11 of the door handle 10.

The vehicle door 2 has a space 2*a* that accommodates the door handle 10, and a surface opening 2*b* through which the space 2*a* is opened to outside of the vehicle. The door handle 10 is provided to the vehicle door 2. The door handle 10 is attached so as to be fitted into the surface opening 2*b* of the vehicle door 2, and advances/retracts through the surface opening 2*b* between the vehicle-inside space 2*a* and outside of the vehicle. Regarding the advancing/retracting of the door handle 10, for example, the entire door handle 10 may advance/retract in the vehicle-inside/outside direction, or one longitudinal-direction end side of the door handle 10 may advance/retract in the vehicle-inside/outside direction with the other longitudinal-direction end side thereof as a fulcrum.

The door handle 10 is shiftable between a stored state and an exposed state. The stored state is a state in which the door handle 10 is stored in the vehicle door 2, i.e., in the space 2*a*, and specifically, a state in which the lid portion 11 described later closes the surface opening 2*b* of the vehicle door 2 and thus is flush with the surface of the vehicle door 2. The exposed state is a state in which the door handle 10 is exposed from the surface opening 2*b* of the vehicle door 2, and specifically, a state in which the lid portion 11 pops out from the surface of the vehicle door 2 toward outside of the vehicle.

In the stored state of the door handle 10, a person is not allowed to perform an opening operation on the door handle 10 and thus is not allowed to open the vehicle door 2 from outside of the vehicle. On the other hand, in the exposed state of the door handle 10, a person is allowed to perform an opening operation on the door handle 10 and thus is allowed to open the vehicle door 2 from outside of the vehicle.

The door handle 10 includes the lid portion 11 and the support portion 12. The lid portion 11 is a lid for closing the surface opening 2*b* of the vehicle door 2 in the stored state of the door handle 10. The lid portion 11 is formed in a shape corresponding to the surface opening 2*b* of the vehicle door 2. The support portion 12 is a bar-shaped part supporting the lid portion 11. The support portion 12 is supported so as to advance/retract in the vehicle-inside/outside direction with respect to the vehicle door 2.

The door handle 10 has a so-called pop-up mechanism. That is, in the stored state of the door handle 10, when the lid portion 11 is pressed from outside to inside of the vehicle, the door handle 10 mechanically advances toward outside of the vehicle so as to shift to the exposed state. On the other hand, in the exposed state of the door handle 10, when the lid portion 11 is pulled toward outside of the vehicle by less than a predetermined force, the door handle 10 mechanically retracts toward inside of the vehicle so as to shift to the stored state.

The door handle actuator 20 is an actuator for shifting the door handle 10 between the stored state and the exposed state. The door handle actuator 20 is an electric actuator such as a motor actuated by supply of power. The door handle actuator 20 shifts the door handle 10 between the stored state and the exposed state by being supplied with power in accordance with a command from the control device 30, as described in detail later.

The control device 30 is a device for controlling shifting of the door handle 10 between the stored state and the exposed state. The control device 30 is composed of a microcomputer as a main component. The control device 30 includes sensor equipment 31, an abnormality detection unit 32, a control unit 33, a drive unit 34, a main power supply determination unit 35, art auxiliary power supply starting unit 36, and a human detection sensor 37.

The sensor equipment 31 includes sensors for outputting signals indicating various states about the vehicle. Examples of the sensor equipment 31 are an acceleration sensor for outputting a signal in accordance with a forward/backward acceleration of the vehicle, an airbag control device for outputting a signal in accordance with whether or not an airbag is inflated, a sensor for outputting a signal in accordance with whether or not fire has occurred on the vehicle, a sensor for outputting a signal in accordance with whether or not the vehicle is submerged, a vehicle-interior camera for outputting image data taken by imaging inside of the vehicle (in particular, the face of a vehicle driver), and a voltage sensor for outputting a signal in accordance with the voltage across the main power supply 40. The sensor equipment 31 is not limited to one sensor but may include a plurality of sensors. An output signal from the sensor equipment 31 is supplied to the abnormality detection unit 32.

The abnormality detection unit 32 is a unit for detecting abnormality of the vehicle. The abnormality detection unit 32 detects abnormality occurring on the vehicle on the basis of a signal from the sensor equipment 31. Here, the abnormality of the vehicle refers to an emergency state such as a vehicle accident where a vehicle occupant, including the vehicle driver, is likely to have difficulty in getting off from inside of the vehicle, and examples thereof are a case where the vehicle collides, a case where an in-vehicle airbag is inflated, a case where the vehicle driver loses consciousness, and a case where the power supply voltage of the main power supply 40 is lowered to less than a prescribed value A detection result of the abnormality detection unit 32 is supplied to the control unit 33, and is also supplied to the auxiliary power supply starting unit 36.

The control unit 33 is a part for controlling the door handle actuator 20. The control unit 33 controls the door handle actuator 20 on the basis of locking/unlocking of the vehicle door 2 by the lock device a detection result of the abnormality detection unit 32, and the like. In particular, when abnormality of the vehicle is detected by the abnormality detection unit 32, the control unit 33 controls the door handle actuator 20 so that the door handle 10 shifts from the stored state to the exposed state.

The drive unit 34 is a part for driving the door handle actuator 20. The control unit 33 supplies a drive signal to the drive unit 34 so as to control the door handle actuator 20. The drive unit 34 drives the door handle actuator 20 in accordance with the drive signal from the control unit 33.

The main power supply 40 is a power supply for supplying drive power to the door handle actuator 20. The main power supply 40 is a main battery mounted to the vehicle and also supplies power to lamp equipment and the like other than the door handle actuator 20. The main power supply 40 is connected to the drive unit 34. The door handle actuator 20 is driven by power supplied through the drive unit 34 from the main power supply 40.

The auxiliary power supply 50 is a power supply for supplying drive power to the door handle actuator 20. The auxiliary power supply 50 has a capacity enough to perform, at least once, shifting of the door handle 10 from the stored state to the exposed state by the door handle actuator 20. The auxiliary power supply 50 is, for example, a small-size lithium ion battery, a nickel-metal hydride battery, an ail-solid-state battery, a capacitor, or a manganese battery.

The auxiliary power supply 50 is connected to the drive unit 34 via a switch 51. The switch 51 is turned on/off in accordance with whether or not a condition that supply of drive power from the auxiliary power supply 50 to the door handle actuator 20 is to be executed is satisfied. When the condition is satisfied and thus the switch 51 is turned on, the auxiliary power supply 50 supplies drive power to the door handle actuator 20. The door handle actuator 20 is driven by power supplied from the auxiliary power supply 50 under the above condition being satisfied.

The main power supply determination unit 35 is a part for determining whether or not the main power supply 40 normally supplies drive power to the door handle actuator 20. The main power supply determination unit 35 determines whether or not the main power supply 40 is normal, on the basis of, for example, whether or not the power supply voltage of the main power supply 40 is lowered to less than a predetermined prescribed value or whether or not the system of the main power supply 40 is disconnected. The determination result of the main power supply determination unit 35 is supplied to the auxiliary power supply starting unit 36.

The auxiliary power supply starting unit 36 is a part for electrically connecting the auxiliary power supply 50 to the door handle actuator 20 so as to supply drive power from the auxiliary power supply 50 to the door handle actuator 20. The auxiliary power supply starting unit 36 controls on/off of the switch 51 on the basis of the detection result of the abnormality detection unit 32 and the determination result of the main power supply determination unit 35. Specifically, if abnormality of the vehicle is detected by the abnormality detection unit 32 and the main power supply 40 is determined not to normally supply drive power to the door handle actuator 20 by the main power supply determination unit 35, the auxiliary power supply starting unit 36 turns on the switch 51 so as to execute supply of power from the auxiliary power supply 50 to the door handle actuator 20.

The human detection sensor 37 is a sensor for outputting a signal in accordance with whether or not there is a person around the vehicle. The human detection sensor 37 is, for example, a vehicle-exterior camera for outputting image data taken by imaging outside of the vehicle. The human detection sensor 37 is located in the vicinity of the vehicle door 2, and is provided for detecting, in particular, a person approaching the vehicle door 2. An output signal from the human detection sensor 37 is supplied to the control unit 33. The control unit 33 controls the door handle actuator 20 on the basis of the signal from the human detection sensor 37, as described later.

Hereinafter, operation of the vehicle door handle device 1 will be described.

First, normal operation of the vehicle door handle device 1 will be described.

When the vehicle door 2 is closed with respect to the vehicle body and is in the locked state, normally, the door handle 10 is in the stored state. The locked state of the vehicle door 2 is kept until a proper unlock operation is performed outside the vehicle, if no occupant is present in the vehicle. In this locked state, if a person presses the lid portion 11 of the door handle 10 from outside of the vehicle toward inside of the vehicle, the door handle 10 shifts to the exposed state by the pop-up mechanism. However, if a proper unlock operation is not performed, the vehicle door 2 is kept in the locked state by the lock device 3, and therefore the vehicle door 2 is not opened even when an opening operation is performed on the door handle 10 in the exposed state. Thus, even if the door handle 10 is shifted to the exposed state by a person other than the proper vehicle user, the vehicle door is prevented from being opened. In addition, in the above locked state, if the person pulls the lid portion 11 of the door handle 10 toward outside of the vehicle, the door handle 10 returns to the stored state.

On the other hand, in the above locked state, if the proper vehicle user having the portable key performs an unlock operation outside the vehicle, the lock device 3 unlocks the vehicle door 2, and the control unit 33 controls the door handle actuator 20 so as to shift the door handle 10 from the stored state to the exposed state. As a result of this processing, the door handle 10 comes into the exposed state. Then, if an opening operation is performed on the door handle 10, the latch state of the vehicle door 2 is released so that the vehicle door 2 is opened. The unlocking of the vehicle door 2 by the lock device 3 in this case may be performed, before execution of release of the latch state, when an opening operation is performed after the door handle 10 shifts to the exposed state.

Accordingly, when the vehicle door 2 is closed with respect to the vehicle body and is in the locked state, if the proper vehicle user unlocks the vehicle door 2 though an unlock operation, the door handle 10 shifts from the stored state to the exposed state. This allows the proper vehicle user to open the vehicle door 2 by performing an opening operation on the door handle 10 just before getting in the vehicle.

Next, emergency operation of the vehicle door handle device 1 will be described.

In the stored state of the door handle 10, the door handle 10 is stored in the vehicle door 2 and is flush with the surface of the vehicle door 2, without popping out toward outside of the vehicle. Therefore, for example, in a case where vehicle abnormality such as a vehicle accident has occurred, a rescuer may be unable to find the door handle 10 immediately or to recognize how to perform an opening operation on the door handle 10 and enable the vehicle door to be opened.

Accordingly, in the present embodiment, when abnormality of the vehicle has occurred, the door handle 10 is shifted to the exposed state so as to allow an opening operation, so that the door handle 10 is readily found and the vehicle door 2 is readily opened.

Figure 4:
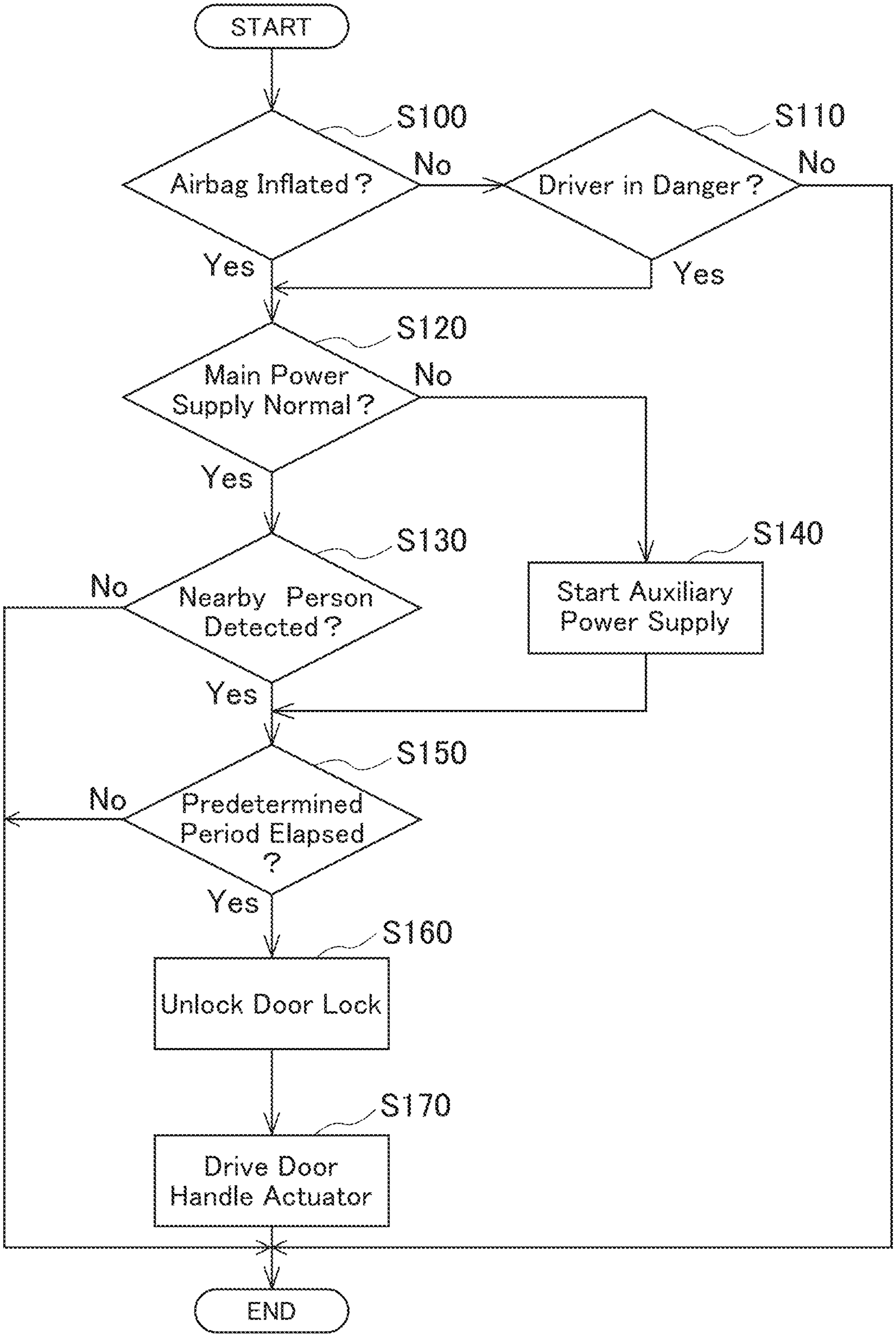
FIG. 4 is a flowchart of an example of a control routine executed in the vehicle door handle device of the embodiment.

That is, in the control device 30, the sensor equipment 31 outputs signals indicating various states about the vehicle. The abnormality detection unit 32 detects abnormality of the vehicle on the basis of the signals from the sensor equipment 31. Specifically, by the abnormality detection unit 32, the control device 30 determines whether or not the airbag is inflated (step S100 in a routine shown in FIG. 4) and determines whether or not the vehicle driver is in danger, e.g., loses consciousness (step S110).

If the airbag is determined to be inflated in step 3100 or the vehicle driver is determined to be in danger in step 3110, next, the control device 30 determines whether or not the main power supply 40 normally supplies drive power to the door handle actuator 20, by the main power supply determination unit 35 (step S120).

If she main power supply 40 is determined to normally supply drive power to the door handle actuator 20 in step S120, next, the control device 30 determines whether or not there is a person around the vehicle, using the human detection sensor 37 (step S130). On the other hand, if the main power supply 40 is determined not to normally supply drive power to the door handle actuator 20 in step S120, next, the control device 30 turns on the switch 51 so as to execute supply of power from the auxiliary power supply 50 to the door handle actuator 20, by the auxiliary power supply starting unit 36 (step S140).

If presence of a person around the vehicle is detected in step S130 or if the switch 51 is turned on in step S140, next, the control device 30 determines whether or not a predetermined period has elapsed since detection of abnormality of the vehicle by the abnormality detection unit 32 (step S150). The above predetermined period is a period for preventing the lock device 3 from switching the vehicle door 2 from the locked state to the unlocked state or preventing the door handle actuator 20 from shifting the door handle 10 from the stored state to the exposed state immediately after occurrence of abnormality of the vehicle, and is set to several tens of seconds or several minutes, for example.

If the predetermined period is determined to have elapsed since occurrence of vehicle abnormality in step S150, next, the lock device 3 unlocks the vehicle door 2 (step S160) and she control unit 33 controls the door handle actuator 20 so as so shift the door handle 10 from the stored state to the exposed state (step S170).

In this way, in the vehicle door handle device 1, in a case where abnormality has occurred on the vehicle, e.g., the airbag is inflated or the vehicle driver loses consciousness, the vehicle door 2 is unlocked and the door handle 10 is shifted from the stored state to the exposed state.

If the door handle 10 is in the exposed state, even a person who does not knows the structure of the door handle 10 is more likely to find the door handle 10 as compared to a case where the door handle 10 is in the stored state. In addition, for shifting the door handle 10 from the stored state to the exposed state, a person outside the vehicle need not press the door handle 10 toward inside of the vehicle. Therefore, even a person who does not recognize how to operate the door handle 10 in the stored state so as to be shifted to the exposed state visually recognizes the door handle 10 in the exposed state without pressing the door handle 10 toward inside of the vehicle.

Further, if the vehicle door 2 is unlocked and the door handle 10 is in the exposed state, a person outside the vehicle easily understands how to perform an opening operation on the vehicle door 2, so that the person outside the vehicle jg prompted to perform an opening operation on the door handle 10 popping up from the surface of the vehicle door 2 toward outside of the vehicle, and through the opening operation, the latch state of the vehicle door 2 is released and the vehicle door 2 is opened. Thus, the vehicle door 2 is readily opened.

Accordingly, with the vehicle door handle device 1, the door handle 10 stored in the vehicle door 2 is exposed to outside of the vehicle so as to allow an opening operation, when abnormality of the vehicle has occurred. This allows a person to readily find the door handle 10 and readily open the vehicle door 2, when abnormality of the vehicle has occurred. In this regard, in a case where a vehicle occupant, including the vehicle driver, loses consciousness and rescue is needed, a rescuer readily finds the door handle 10 and readily opens the vehicle door 2, whereby a period until the vehicle occupant is rescued from when the rescuer arrives at the vehicle is shortened.

When the door handle 10 is exposed to outside of the vehicle so as to allow an opening operation at the time of occurrence of vehicle abnormality as described above, in order to allow a person to more readily recognize the state of the door handle 10, a light may be turned on so as to make the door handle 10 visually conspicuous or a sound may be outputted from a speaker or the like so as to let the person aurally recognize the state of the door handle 10.

In the vehicle door handle device 1, when abnormality of the vehicle has occurred, if the main power supply 40 normally supplies drive power to the door handle actuator 20, drive power is supplied from the main power supply 40 to the door handle actuator 20 so that the door handle 10 shifts from the stored state to the exposed state. On the other hand, when abnormality of the vehicle has occurred, if the main power supply 40 does not normally supply drive power to the door handle actuator 20, the auxiliary power supply 50 is connected to the door handle actuator 20 and drive power is supplied from the auxiliary power supply 50 to the door handle actuator 20 so that the door handle 10 shifts from the stored state to the exposed state.

Therefore, for example, even in a case where, due to a vehicle accident or the like, the main power supply 40 fails or the system of the main power supply 40 is disconnected, the door handle actuator 20 is driven using the auxiliary power supply 50, thus ensuring that the door handle 10 shifts from the stored state to the exposed state and the vehicle door 2 is opened.

When abnormality of the vehicle has occurred, if the main power supply 40 normally supplies drive power to the door handle actuator 20, operation is performed such that, after presence or a person around the vehicle is detected, drive power is supplied from the main power supply 40 to the door handle actuator 20 so that the door handle 10 shifts from the stored state to the exposed state. In this configuration, when abnormality of the vehicle has occurred, even if the main power supply 40 normally supplies drive power to the door handle actuator 20, the door handle 10 is kept in the stored state until presence of a person around the vehicle is detected.

Therefore, after abnormality of the vehicle has occurred, if the main power supply 40 is normal, the door handle 10 is prevented from shifting to the exposed state when no person is present around the vehicle. Thus, shifting of the door handle 10 from the stored state to the exposed state is performed only at a necessary timing when there is a person outside the vehicle to perform an opening operation.

In a case where the main power supply 40 does not normally supply drive power to the door handle actuator 20, there is a possibility that the human detection sensor 37 does not normally operate due to failure of the main power supply 40 or the like. Accordingly, when abnormality of the vehicle has occurred, if the main power supply 40 does not normally supply drive power to the door handle actuator 20, drive power is supplied from the auxiliary power supply 50 to the door handle actuator 20 irrespective of whether or not presence of a person around the vehicle is detected, and thus the door handle 10 shifts from the stored state to the exposed state.

Therefore, when abnormality of the vehicle has occurred, if the main power supply 40 does not normally supply drive power to the door handle actuator 20, the door handle 10 is immediately shifted from the stored state to the exposed state, using the auxiliary power supply 50. Thus, occurrence of an event where the door handle 10 is not shifted from the stored state to the exposed state because the human detection sensor 37 does not normally operate, is avoided.

Even when abnormality of the vehicle has occurred, the vehicle door 2 is locked and the door handle 10 is kept in the stored state, until the predetermined period has elapsed since the occurrence of abnormality. Then, after elapse of the predetermined period, the vehicle door 2 is unlocked and the door handle 10 shifts from the stored state to the exposed state. In this way, a phenomenon in which the vehicle door 2 is unlocked and the door handle 10 comes into the exposed state immediately after occurrence of abnormality of the vehicle, is avoided, thus preventing a situation in which, immediately after occurrence of abnormality as in a case where a traveling vehicle collides, for example, the vehicle door 2 becomes likely to be unintentionally opened due to the collision.

After abnormality of the vehicle has occurred, a person may be allowed to unlock the vehicle door 2 even before the predetermined period has elapsed. For this purpose, an emergency release button or the like operable by a person for unlocking the vehicle door 2 may be provided to the door handle 10 or the like.

In the above embodiment, the stored state of the door handle 10 is the state in which the door handle 10 is stored in the vehicle door 2 and also the lid portion 11 of the door handle 10 closes the surface opening 2*b* of the vehicle door 2 and thus is flush with the surface of the vehicle door 2. In addition, the exposed state of the door handle 10 is the state in which the lid portion 11 pops up from the surface of the vehicle door 2 toward outside of the vehicle so that the door handle 10 is exposed from the surface opening 2*b* of the vehicle door 2.

However, the present invention is not limited thereto. The stored state of the door handle 10 may be any state in which the door handle 10 is stored in the vehicle door 2 so as not to allow a person to perform an opening operation, and the exposed state of the door handle 10 may be any state in which the door handle 10 is exposed from the surface opening 2*b* of the vehicle door 2 so as to allow a person to perform an opening operation. For example, the door handle 10 may be provided in a fixed state on the back side relative to the surface opening 2*b* of the vehicle door 2, and a lid for opening/closing the surface opening 2*b* may be provided. Then, a state in which the lid closes the surface opening 2*b* may be defined as the stored state of the door handle 10, and a state in which the lid is opened from the surface opening 2*b* may be defined as the exposed state of the door handle 10.

The present invention is not limited to the embodiment and the modifications described above, and various changes may be made without departing from the gist of the present invention.

This application claims priority on Japanese Patent Application No. 2021-140540 filed in Japan on Aug. 30, 2021, the entire contents of which are incorporated herein by reference.

The invention claimed is:

1. A vehicle door handle device comprising:

a door handle provided to a vehicle door and shiftable between a stored state of being stored in the vehicle door and an exposed state of being exposed from a surface opening of the vehicle door, the door handle being configured to allow an opening operation of releasing a latch of the vehicle door in the exposed state;

a door handle actuator configured to shift the door handle between the stored state and the exposed state;

a drive unit configured to drive the door handle actuator;

a main power supply connected to the drive unit and configured to supply drive power to the door handle actuator;

an auxiliary power supply connected to the drive unit via a switch, the auxiliary power supply being different from the main power supply and configured to supply drive power to the door handle actuator;

an abnormality detection unit configured to detect abnormality of a vehicle;

a control unit configured to control the door handle actuator so that the door handle shifts from the stored state to the exposed state when the abnormality is detected;

a main power supply determination unit configured to determine whether or not the main power supply normally supplies drive power to the door handle actuator; and an auxiliary power supply starting unit configured to connect the auxiliary power supply to the door handle actuator so as to supply drive power from the auxiliary power supply to the door handle actuator by turning on the switch, when the abnormality is detected and the main power supply is determined not to normally supply drive power to the door handle actuator.

2. The vehicle door handle device according to claim 1, wherein the abnormality detection unit detects, as the abnormality, that an airbag mounted to the vehicle is inflated.

3. The vehicle door handle device according to claim 1, wherein when a predetermined period has elapsed since detection of the abnormality, the control unit drives the door handle actuator to shift the door handle from the stored state to the exposed state.

4. The vehicle door handle device according to claim 3, further comprising a lock device configured to lock the vehicle door when the abnormality is detected, and unlock the vehicle door when the predetermined period has elapsed.

5. A vehicle door handle device comprising:

a door handle provided to a vehicle door and shiftable between a stored state of being stored in the vehicle door and an exposed state of being exposed from a surface opening of the vehicle door, the door handle being configured to allow an opening operation of releasing a latch of the vehicle door in the exposed state;

a door handle actuator configured to shift the door handle between the stored state and the exposed state;

a main power supply configured to supply drive power to the door handle actuator;

an auxiliary power supply connected to the door handle actuator via a switch, the auxiliary power supply being different from the main power supply and configured to supply drive power to the door handle actuator;

a control device comprising a microcomputer configured to:

detect abnormality of a vehicle;

control the door handle actuator so that the door handle shifts from the stored state to the exposed state when the abnormality is detected;

determine whether or not the main power supply normally supplies drive power to the door handle actuator; and connect the auxiliary power supply to the door handle actuator so as to supply drive power from the auxiliary power supply to the door handle actuator by turning on the switch, when the abnormality is detected and the main power supply is determined not to normally supply drive power to the door handle actuator.

6. The vehicle door handle device according to claim 5, wherein the control device detects, as the abnormality, that an airbag mounted to the vehicle is inflated.

7. The vehicle door handle device according to claim 5, wherein when a predetermined period has elapsed since detection of the abnormality, the control device drives the door handle actuator to shift the door handle from the stored state to the exposed state.

8. The vehicle door handle device according to claim 7, further comprising a lock device configured to lock the vehicle door when the abnormality is detected, and unlock the vehicle door when the predetermined period has elapsed.

* * * * *